United States Patent
Simon

(10) Patent No.: US 8,474,511 B2
(45) Date of Patent: Jul. 2, 2013

(54) PROCESS FOR PRODUCING A TWIST-BEAM AXLE IN A HYBRID CONSTRUCTION

(75) Inventor: Marc Simon, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/276,792

(22) Filed: Oct. 19, 2011

(65) Prior Publication Data

US 2012/0090802 A1    Apr. 19, 2012

(30) Foreign Application Priority Data

Oct. 19, 2010   (DE) .......................... 10 2010 038 260

(51) Int. Cl.
*B22D 19/04*   (2006.01)
*B22D 19/16*   (2006.01)

(52) U.S. Cl.
USPC ............................. 164/98; 164/111; 164/112

(58) Field of Classification Search
USPC .......................................... 164/98, 111, 112
See application file for complete search history.

(56) References Cited

U.S. PATENT DOCUMENTS

| 6,318,443 | B1 * | 11/2001 | Leith ............................... 164/98 |
| 6,863,113 | B2 * | 3/2005 | El-Demallawy et al. ....... 164/17 |
| 2007/0271793 | A1 * | 11/2007 | Mellis et al. .................. 29/897.2 |
| 2008/0265626 | A1 * | 10/2008 | Dorr et al. ..................... 296/204 |
| 2009/0014144 | A1 * | 1/2009 | Kotagiri et al. ............... 164/111 |

FOREIGN PATENT DOCUMENTS

| DE | 195 42 522 A1 | 5/1997 |
| DE | 103 57 940 B3 | 9/2005 |

* cited by examiner

*Primary Examiner* — Kevin P Kerns
(74) *Attorney, Agent, or Firm* — L.C. Begin & Associates, PLLC

(57) ABSTRACT

A process for producing a twist-beam axle is provided. Related thereto, the twist-beam axle has a light metal longitudinal link and an iron metal transverse arm. The process contains the following steps: producing a casting mold for the respective longitudinal link; inserting one end of the transverse arm into a corresponding recess in the casting mold; then pouring the liquid light metal into the casting mold for the longitudinal link; cooling the poured light metal; and removing the transverse arm joined to the cooled light metal from the casting mold.

8 Claims, No Drawings

_US 8,474,511 B2_

PROCESS FOR PRODUCING A TWIST-BEAM AXLE IN A HYBRID CONSTRUCTION

CROSS-REFERENCE TO RELATED APPLICATIONS

This application claims priority to German Application No. 102010038260.4, having a filing date of 19 Oct. 2010.

FIELD OF THE INVENTION

The invention relates to a process for producing a twist-beam axle, which respectively has a light metal longitudinal link and an iron metal transverse arm.

BACKGROUND OF THE INVENTION

EP 0 774 369 B1 discloses a twist-beam axle for motor vehicles, having two wheel-carrying longitudinal links and a transverse arm arranged therebetween. The longitudinal links are produced in a thixoforming process, i.e. in an (aluminum) die casting process with subsequent heat treatment. An insert made of a material of the same type as the material of the transverse arm, i.e. a weldable material, is inserted into the longitudinal link and joined with a form fit to the longitudinal link by means of the thixoforming process, such that it is possible to establish a welded join between the insert, i.e. effectively the longitudinal link, and the transverse arm. It is thus possible to produce a twist-beam axle in a hybrid construction, in which the longitudinal links are formed from aluminum and the transverse arm is formed from a solid steel material. This process has the disadvantage that the mutually corresponding components, i.e. the insert and the transverse arm, have to be strictly aligned with respect to one another for establishing the welding join. Such an alignment of the mutually corresponding components is very time-consuming and complex. This is also the case, in particular, because the insert is in fact exposed to considerable temperature influences and changes, such that it is displaced, even if minimally, from its original position. In addition, the wall thicknesses of the two components have to be matched to one another. The amount of work involved after the welded join has been established is also considerable, since the weld seam or the covering layer thereof itself should be worked to a smooth surface in order to avoid instances of notched loading. The quality of the weld seam root should also be checked. In addition, the weld seam subsequently has to be subjected to quality assurance so that it is possible to determine whether said weld seam has faults which reduce the service life, and this also has to be carried out using so-called nondestructive material tests such as surface cracking tests, X-rays and/or ultrasound investigations. In addition, the weld seam is arranged in a transition region between the transverse arm and the longitudinal links, which transition region is fundamentally subjected to particularly high torsional and bending loads.

EP 0 788 903 B1 likewise relates to a twist-beam rear axle in a hybrid construction. In EP 0 788 903 B1, too, the transverse arm is joined to the longitudinal link as the latter is being subjected to a die casting process, in that the aluminum shrinks during cooling. In this respect. EP 0 788 903 B1 identified that there is a risk of corrosion in the region in which the longitudinal link is joined to the transverse arm, and therefore special measures for treating the surface are provided.

In principle, it is therefore known to produce twist-beam axles, in particular twist-beam rear axles, in a hybrid construction, in which the longitudinal links are produced from a light metal, for example aluminum, and the transverse arm joining the two longitudinal links is produced from an iron metal, for example from a high-strength steel. This is based on the knowledge that vehicles having the smallest possible fuel consumption should be developed, the weight having a considerable influence on the fuel consumption. In this respect, it is expedient to use light metals, e.g. aluminum, or to replace steel components with aluminum components, and this noticeably leads to a reduction in weight and thus to fuel savings. However, a problem which is presented here is that light metals, e.g. aluminum, cannot be used unconditionally in regions which are subjected to high loads and undergo, for example, severe elastic deformation, and, e.g. in the case of the transverse arm joining the two longitudinal links, can also be referred to as the torsional profile. For reasons relating to strength and rigidity, high-strength steel is therefore provided in these regions. This is associated with the problem of a secure join between the two different types of materials. Here, a direct welded join is not possible, and this is why EP 0 774 369 B1 proposes the incorporation of steel inserts during the thixoforming process, although this leads to the aforementioned disadvantages.

BRIEF SUMMARY OF THE INVENTION

The invention is based on the object of specifying a process for producing a twist-beam axle, in particular a twist-beam rear axle, which provides a twist-beam axle taking the economic viability into consideration while satisfying the quality criteria required for the motor vehicle industry and dispensing with complex alignment work or postprocessing.

According to the invention, the object is achieved by a process for producing a twist-beam axle, which respectively has a light metal longitudinal link and an iron transverse arm, said process having the following steps:

producing a casting mold for the respective longitudinal link; inserting an appropriate end of the transverse arm into a corresponding recess in the casting mold; only then pouring a liquid light metal into the casting mold for the longitudinal link; introducing the light metal melt into the casting mold and allowing the light metal to cool; and removing the cooled light metal joined to the end of the transverse arm from the casting mold. Further, particularly advantageous configurations of the invention are disclosed below.

It should be pointed out that the features presented individually in the following description can be combined with one another in any desired, technically meaningful way and reveal further configurations of the invention. The description additionally characterizes and specifies the invention.

DETAILED DESCRIPTION OF THE INVENTION

According to the invention, the process for producing a twist-beam axle, in particular a twist-beam rear axle, of a front-wheel drive motor vehicle comprises at least the following steps:

a casting mold is produced for the respective longitudinal link, an appropriate end of the transverse arm is inserted into a corresponding recess in the casting mold, only then is liquid light metal poured into the casting mold for the longitudinal link, such that, as it is being poured in, liquid light metal flows around the ends of the transverse arm inserted into the recesses in the casting mold, the light metal melt introduced into the casting mold is allowed to cool, the cooled light metal joined tQ the end of the transverse arm is removed from the casting mold.

The invention provides a process for producing a twist-beam axle, in which liquid light metal, e.g. an aluminum melt, is poured into the casting mold only when the appropriate end of the transverse arm is inserted into the casting mold. If the light metal melt is then introduced into the casting mold, the liquid light metal can flow around the appropriate end. In this respect, the twist-beam axle, differing from the aluminum die casting process known from the prior art, is produced by simple permanent mold casting, in which the light metal component is cast around the steel profile.

Attachment points for required suspension or chassis components are additionally provided in the casting mold intended for the longitudinal link, in which case there is the obvious advantage that a particular freedom can be achieved in the configuration and design of the respective longitudinal links as a result of the permanent mold casting process.

It is therefore advantageous that the permanent mold casting process according to the invention makes it possible to produce a longitudinal link which is very complex and is likewise joined to the transverse arm, where attachment points for the vehicle body, springs, damper and wheel, for example, are also cast in at the same time.

It is expedient that the light metal melt shrinks during cooling, such that the longitudinal link is joined virtually with a force fit or frictionally to the transverse arm or the end thereof.

The transverse arm can be produced from a closed hollow profile of differing cross section. By way of example, the transverse arm can be formed from a steel pipe having a round cross section or polygonal cross section. It is also conceivable, however, to provide a profile which differs from the central region at the appropriate ends of the transverse arm. By way of example, the transverse arm could have a U or V form at the appropriate ends, where the remainder can have a closed hollow profile or an open profile. However, the ends can also have a round, elliptical or polygonal form or have elevations in places as a closed hollow profile, for example.

In order to be able to establish a form fit between the longitudinal link and the transverse arm or the appropriate ends thereof, it is expedient within the context of the invention to provide recesses, such as round holes, elongated holes or the like, at the appropriate ends. As the liquid light metal is being poured into the casting mold, the light metal melt thus not only flows around the outer extent of the ends, but also passes into the recesses. During the cooling, the light metal melt shrinks, and therefore it is also possible to establish the aforementioned force fit and/or frictional join in addition to the advantageous form fit.

It is of course also possible to provide inwardly directed rounded portions or stamped features instead of the open recesses, into which rounded portions or stamped features the liquid light metal can flow or penetrate as it is being poured into the casting mold.

It is also expedient within the context of the invention if the recesses of the casting mold, into which the ends of the transverse arm are inserted before the liquid light metal is introduced into the casting mold, have such a clear degree of opening, which is matched to the profile of the appropriate ends, such that a small joining clearance is present, which can be dimensioned such that the ends or the transverse arm are or is held in a secure position, preferably without any gaps, in the recesses. After the elements have been joined together, and before liquid light metal is introduced into the casting mold, the ends of the transverse arm therefore preferably bear at least in portions against the boundary walls of the recesses. Only the end portion protruding into the casting mold is therefore surrounded by a stream of the liquid light metal.

In an advantageous procedure, it is provided that the two components are aligned with respect to one another before liquid light metal, i.e. the melt, is introduced or poured into the casting mold, the casting mold and the transverse arm preferably being aligned.

A twist-beam axle of course has two longitudinal links between which the transverse arm extends. It goes without saying that it lies within the context of the invention to join both longitudinal links by casting to the transverse arm at the same time, or to join first one longitudinal link and then the other longitudinal link by casting to the transverse arm.

A casting mold can of course be used repeatedly.

The join between the longitudinal links and the transverse arm which is established by casting according to the invention can withstand high dynamic loads. Thus, reliable transmission of torsional and bending forces from the longitudinal links to the transverse arm is made possible. The transverse arm acts as a torsion bar in compensating for the forces introduced. The twist-beam axle according to the invention allows for efficient manufacture and has good static and dynamic load behavior. Furthermore, an embodiment in a manner optimized for weight is possible. The elimination of weld seams, bolts or rivets contributes to this. Furthermore, the cast join can very effectively combine longitudinal links and transverse arms made of different types of metallic materials. The combination of longitudinal links made of light metal based on aluminum and/or magnesium with transverse arms made of steel or high-strength steel is particularly suitable. It is also advantageous that time-consuming subsequent operations can be dispensed with.

What is claimed is:

1. A process for producing a twist-beam axle, which respectively has a light metal longitudinal link and an iron metal transverse arm, said process comprising at least the following steps:
producing a casting mold for the respective longitudinal link,
inserting an appropriate end of the transverse arm into a corresponding recess in the casting mold, wherein the cross-section of the end of the transverse arm is formed to have a U-shape, a V-shape, a round shape, an elliptical shape, or a polygonal shape, the cross-section of the end being different from the cross-section of a central portion of the transverse arm,
then pouring liquid light metal into the casting mold for the longitudinal link,
cooling the liquid light metal introduced into the casting mold, and
removing the cooled light metal joined to the end of the transverse arm from the casting mold.

2. The process as claimed in claim 1, wherein
the liquid light metal, as it is being poured into the casting mold, flows around the end of the transverse arm inserted into the casting mold.

3. The process as claimed in claim 1, wherein
the twist-beam axle is produced by permanent mold casting, the liquid light metal which forms the longitudinal link being cast around the end of the transverse arm.

4. The process as claimed in claim 1 further comprising the step of:
providing attachment points for suspension or chassis components in the casting mold for the longitudinal link.

5. The process as claimed in claim 1 further comprising the step of, joining the end of the transverse arm at least with a force fit or frictionally to the longitudinal link, after which the liquid light metal is cooled.

6. The process as claimed in claim 1 further comprising the step of:

joining the end of the transverse arm with a form fit to the longitudinal link by providing the end with recesses, into which the liquid light metal can flow as it is being introduced into the casting mold.

7. The process as claimed in claim 1 further comprising the step of:

joining a first and a second longitudinal link of the twist-beam axle by casting to the transverse arm at the same time.

8. The process as claimed claim 1 further comprising the step of:

aligning the casting mold and the transverse arm with respect to one another before liquid light metal is poured into the casting mold.

\* \* \* \* \*